Figure 1:
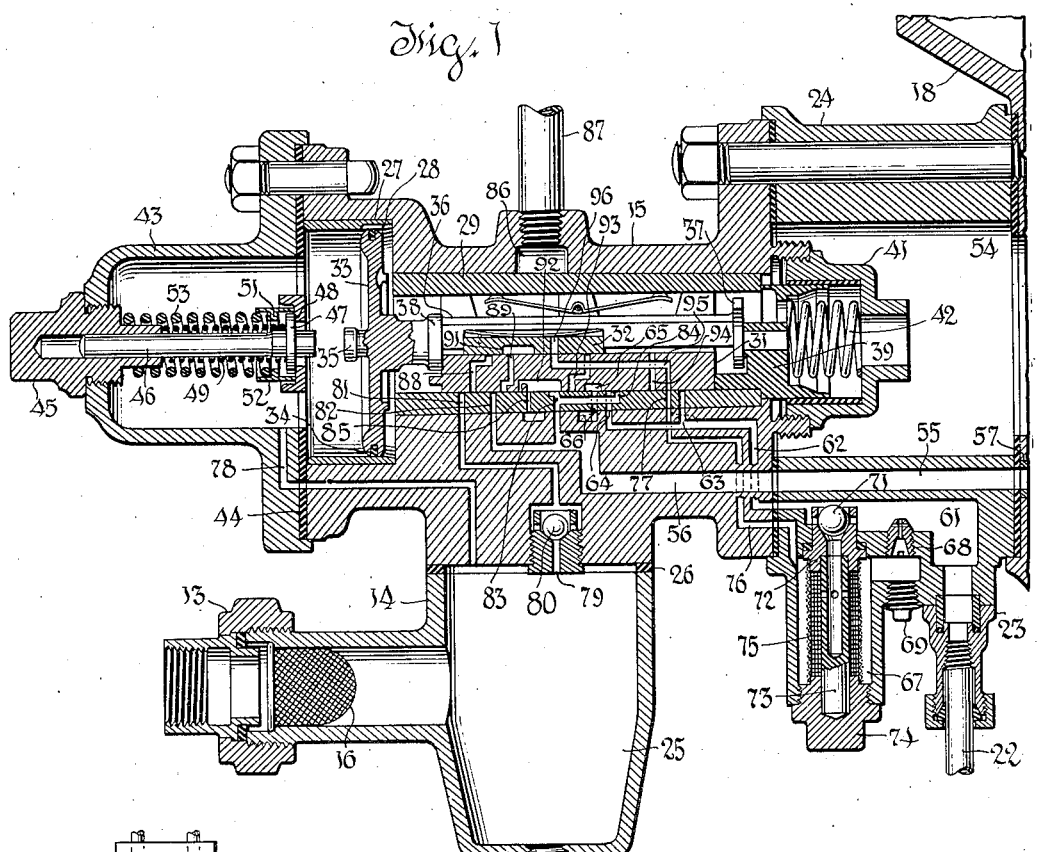

Sept. 26, 1933.  C. A. CAMPBELL  1,928,092

AIR BRAKE

Filed Feb. 21, 1931

Inventor
Charles A. Campbell
By
Attorneys

Patented Sept. 26, 1933

1,928,092

UNITED STATES PATENT OFFICE 1,928,092

AIR BRAKE

Charles A. Campbell, Watertown, N. Y., assignor to The New York Air Brake Company, a corporation of New Jersey Application February 21, 1931. Serial No. 517,605

13 Claims. (Cl. 303—39)

This invention relates to air brakes, and particularly to triple valves of the type controlling the flow from two reservoirs to the brake cylinder, the first the ordinary auxiliary reservoir which furnishes the entire air for service applications, and the second a supplemental reservoir which under certain conditions, such as emergency applications, is drawn upon together with the auxiliary reservoir.

In my prior application Serial No. 439,743, filed March 28, 1930, since continued as application Serial No. 517,604, filed March 16, 1931, I have described and claimed a triple valve which functions, as above stated, to control the flow of air from the reservoirs to the brake cylinder and which has a restricted release position in which the supplemental reservoir air is vented at a restricted rate so as to reduce supplemental reservoir pressure in moderate amounts, say ten pounds per square inch. The purpose of so reducing the supplemental reservoir air is to permit overcharges of the auxiliary reservoir which are likely to exist at the conclusion of restricted recharge to be dissipated into the supplemental reservoir without causing an undesired movement of the triple valve to quick service or full service position.

If the communication between the two reservoirs in normal release position is made large enough to dissipate the auxiliary reservoir charge rapidly, there is a tendency, when the triple valve moves from service position or service lap position to normal release, for supplemental reservoir air to flow into the triple slide valve chamber so rapidly as to interfere with the functions of the triple valve.

This interference may take two forms according to the position of the valve in the train. If the valve is located in a car near the rear of the train where brake pipe pressure rises slowly, the back-feed from the supplemental reservoir may raise auxiliary reservoir pressure more rapidly than brake pipe pressure is rising, producing a tendency of the valve to move back to quick service position. If the ports are properly designed this motion can be checked by throttling of the supplemental reservoir port as the valve moves. In a valve on a car near the forward end of the train which should move to restricted release position, there is a tendency to resist such motion and to delay the triple valve in full release position long enough to cause substantially complete release of brake cylinder pressure before the valve shifts inward to restricted position.

While these difficulties can be minimized by a proper design of the ports, the present invention affords a means for completely overcoming the difficulties without imposing any limit on the equalizing flow from the auxiliary reservoir to the supplemental reservoir and without imposing any limit on the rate of flow from the supplemental reservoir to the brake cylinder in emergency applications.

The result is secured by interposing in that port which connects the reservoirs in normal release position a check valve past which there is a throttled by-pass. The check-valve opens to permit free flow from the auxiliary reservoir to the supplemental reservoir and closes against reverse flow so as to limit such reverse flow to the capacity of the throttling by-pass. The passage which supplies air from the supplemental reservoir to the brake cylinder and preferably also the passage through which the supplemental reservoir is vented to atmosphere in restricted release position are not controlled by the check valve just mentioned.

The invention may be embodied with mechanisms designed to control the rate of build-up of brake cylinder pressure in emergency, as for example is done in my prior application above identified, but as the function of such delayed build-up mechanism is not at all dependent on the check and choke arrangement herein described and claimed, it is deemed unnecessary to illustrate the invention as applied to a triple valve including the emergency build-up feature.

Accordingly, for purposes of description, I have shown it as embodied in a relatively simple triple valve of the type controlling the flow from an emergency and a supplemental reservoir, in the accompanying drawing, in which:—

Fig. 1 is a vertical axial section through a triple valve embodying the invention. In this figure the porting of the slide valve seat, slide valve, and graduating valve are diagrammatic in the sense that all the ports are shown as if they lay in a single plane. By departing from this particular arrangement a smaller slide valve and graduating valve may be secured, and manufacture may be somewhat simplified.

Figure 2:
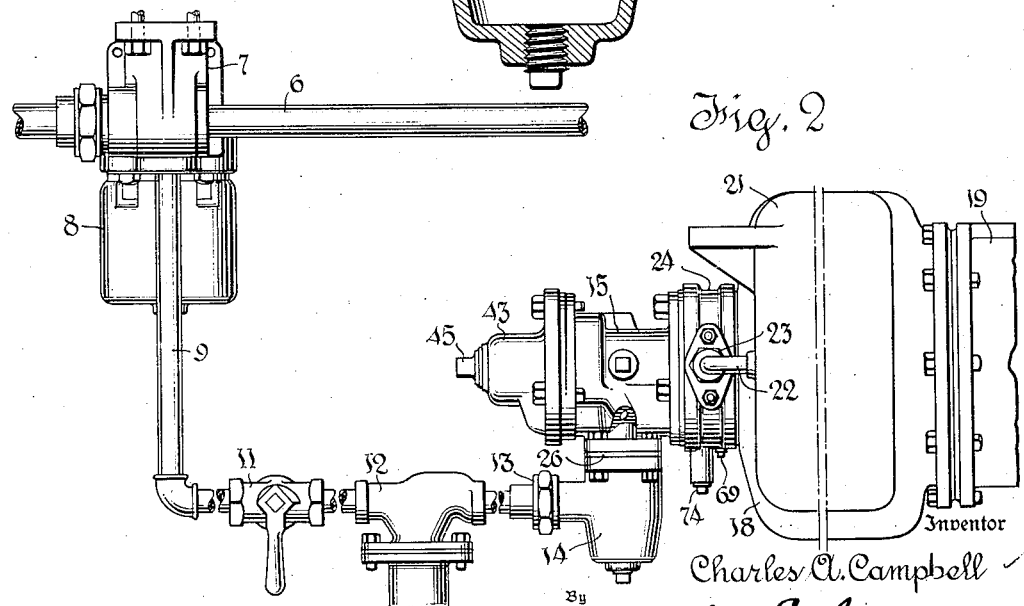

Fig. 2 is a view showing the connection of this valve with the brake pipe, auxiliary and supplemental reservoirs and brake cylinder.

Referring first to Fig. 2, 6 represents the brake pipe which is understood to extend from end to end of the train and to be connected from car to car as usual. Pressure in the brake pipe is controlled by an engineer's brake valve of any suitable type. 7 represents a combined bracket and pipeless vent valve mount with which the brake pipe communicates and upon which is mounted a brake pipe vent valve 8 of suitable type. The purpose of the vent valve 8 is to vent the brake pipe on each car when pressure in the brake pipe is reduced at an emergency rate. This vent valve takes the place of the emergency valve mechanism commonly embodied in quick action types of triple valves.

While the use of a brake pipe vent valve is preferred, the present invention is not limited in this respect.

9 is a branch pipe leading from the member 7 and in direct communication with the brake pipe 6. It is provided with a cut-out cock 11 and centrifugal dust separator 12, and communicates by way of union 13 with a lower case or body 14 of a triple valve indicated generally by the numeral 15 applied to its body.

18 represents the auxiliary reservoir on one end of which is mounted the brake cylinder 19. The supplemental reservoir is indicated at 21 and is connected by a pipe 22 and flange connection 23 with a filler piece 24 interposed between the body 15 of the triple valve and the auxiliary reservoir 18.

Turning now to Fig. 1, the construction of the triple valve will be described. The lower case 14 forms a drain cup 25 with which the connection 13 communicates. The lower case is connected to the body 15 by bolted flanges, as clearly shown in Fig. 2, and the joint is sealed by means of a gasket 26. The usual strainer 16 is provided adjacent union 13.

The body 15 has the usual cylinder bushing 27 with charging groove 28 and the usual valve chamber bushing 29 which is formed with the usual seat for the slide valve 31. Mounted on the slide valve 31 is a graduating valve 32. The triple piston 33 works in the bushing 27 and has the usual packing ring 34, graduating button 35 and piston stem 36. On the inner end of the piston stem is a spider 37 which guides the piston stem in the bushing 29 and which engages the slide valve 31 to move the same in an outward direction.

The collar 38 on the stem 36 engages the valve 31 and moves it in an inward direction, the spider 37 and collar 38 being so spaced that the valve 31 has lost motion relatively to the stem 36. The graduating valve 32 moves positively with the stem 36, being closely confined in a notch in said stem. The two valves are held to their seats by bow springs clearly shown in the drawing.

In normal release position the end of stem 36 engages the retard stop 39 which is guided in the member 41 threaded on the inner end of the body 15. The retard stop spring 42 acts between the member 41 and the retard stop 39 and resists motion of the piston stem from normal release and recharge position to restricted release and recharge position.

The front cap 43 seats on the usual front cap gasket 44 which also serves as a seat for the piston 33 in its outermost position. There is a guide plug 45 which is threaded in and closes an aperture in the front cap 43 and guides a graduating stem 46. The graduating stem 46 has a collar or flange 47 which seats against a seat 48 in the front cap and limits the inward motion of the stem 46. There is a light graduating spring 49 which is confined between the plug 45 and the flange 47. After the stem 46 has been forced back a short distance by the piston 33, it engages an inward extending flange 51 on the ring 52, the ring 52 being normally seated against the seat 48. A second heavier graduating spring 53 is confined between the plug 45 and the inwardly extending flange 51 on ring 52.

The parts are so proportioned that button 35 engages stem 46 in quick service position, while in full service position, the flange 47 engages the flange 51 on ring 52. In emergency or overreduction position, both springs are overpowered and the piston 33 seats on the gasket 44.

The insert 24 is provided with a through aperture 54 which connects the valve chamber within the bushing 29 with the interior of the auxiliary reservoir 18. It is also provided with a through passage 55 which connects the brake cylinder port 56 in body 15 with the brake cylinder pipe 57 which extends through the auxiliary reservoir 18 to the brake cylinder 19 as usual.

The pipe 22 which leads from the supplemental reservoir 21 communicates with a chamber 61 which is connected by a relatively large passage 62 directly with two ports 63 and 64 in the slide valve seat. The port 63 is the port through which supplemental reservoir air is furnished to the slide valve chamber in emergency position. Port 64 is the port through which supplemental reservoir air is exhausted in restricted release position. In restricted release position a recess 65 in the slide valve 31 connects port 64 with an exhaust port 66 in the slide valve seat. This exhaust port is independent of the port through which the brake cylinder is exhausted, and consequently, is not controlled by the retainer valve if a retainer valve is used.

Also formed in the insert 24 is a second chamber 67 which communicates with the chamber 61 by way of two paths. The first path which is constantly open is through a removable choke 68, access to which may be had by removing the plug 69. The purpose is to permit the interchange of choke plugs 68 having apertures of different sizes, the interchange of plugs permitting the use of chokes of different flow capacity. The second communication between the chambers 61 and 67 is past the ball check valve 71 which closes against flow from chamber 61 to 67 and opens to permit free flow in the reverse direction.

Check valve 71 forms part of a removable check valve and strainer unit of the type described and claimed in Patent 1,847,068, March 1, 1932. Briefly stated, there is a removable check valve seat 72 which is held in place by a hollow stem 73 and a removable threaded plug 74 screwed into the member 24. The hollow stem 73 is surrounded by a strainer 75. Leading from the chamber 67 is a passage 76 which leads to a port 77 in the seat for slide valve 31.

There is a passage 78 leading from the space within the drip cup 25 to the space to the left of piston 33. There is a passage 79 leading from the space within the drip cup 25 past check valve 80 to a quick service port 81 on the seat for the slide valve 31. There is a second quick service port 82 in the seat for the slide valve 31, and this port 82 communicates directly with the brake cylinder passage 56, as do service port 83 and an emergency port 84 also formed in the seat for slide valve 31. The exhaust port in the slide valve seat appears at 85 and leads by way of annular passage 86 to the retainer pipe 87.

The slide valve is provided with ports 88 and 89 which in quick service position register with ports 81 and 82 in the seat and are then bridged by the recess 91 in the graduating valve 32. The effect is to vent brake pipe air to the brake cylinder. The ports are without function in other positions of the slide valve.

There is on the lower face of the slide valve a recess 92 which in normal release position (Fig. 1) connects the ports 83 and 85 to exhaust the brake cylinder. The recess 92 has a restricted extension clearly shown in the drawing, which in restricted release position registers with the port 85 while the main portion of the recess 92 registers with the port 83. Consequently, exhaust from the brake cylinder is restricted.

The service port 93 extends from the top to the bottom of the valve 31 and is controlled by the graduating valve 32. In quick service position port 93 is in partial register and in full service position in direct register with the port 83. In service lap the upper end of the port is blanked by the graduating valve 32. The emergency port 94 extends from the top to the bottom of the valve 31 and is not controlled by the graduating valve 32. This port registers with the port 84 in emergency and over-reduction positions, at which time the port 63 is cleared by the slide valve 31 so that air from the supplemental reservoir flows through the passage 62 and port 63 to the slide valve chamber from which auxiliary reservoir air, as well as supplemental reservoir air, flows through the ports 94 and 84 to the brake cylinder.

Extending through the slide valve 31 from top to bottom is a charging and equalizing port 95. In normal release position it registers with the port 77, at which time it is opened by the graduating valve 32.

In the diagrammatic showing of Fig. 1 the graduating valve 32 is provided with a through port 96 for this purpose. The functions of the valve can now be briefly traced.

Normal release after service

If the valve moves to normal release after service application, the parts assume the position shown in Fig. 1. The supplemental reservoir 21 will at such time be charged to full pressure, while the pressure in the auxiliary reservoir will have been reduced. Consequently, in the first stage of normal release air flows from the reservoir through pipe 22, chamber 61, choke 68, passage 76 and ports 77, 95 and 96. It will be observed that the check valve 71 closes against this flow so that the choke 68 controls the rate of back-flow and limits the rise of pressure in the auxiliary reservoir which would otherwise be occasioned by uncontrolled feed-back from the supplemental reservoir.

Restricted release following service

If the triple valve started to move toward restricted release following a service application, it must pass through normal release position. If the feed-back from reservoir 21 to the valve chamber were rapid, there would be a tendency to check the triple valve in normal release position long enough to permit the brake cylinder pressure to be dissipated. The presence of the choke 68 overcomes this difficulty.

Normal release after restricted release

Assume now that the triple valve moves back to normal release position after having been in restricted release position. In restricted release position the supplemental reservoir will have been partially vented by way of pipe 22, chamber 61, passage 62 and ports 64, 65 and 66. At the same time the auxiliary reservoir 18 may have been overcharged by flow through the feed groove 28. When the triple valve moves to normal release position flow from auxiliary reservoir to the supplemental reservoir takes place by way of ports 96, 95, 77, 76, past check valve 71, through chamber 61 and pipe 22. The check valve opens to permit free flow and consequently the pressure is equalized before the valve can move to quick service or service position.

Except for the presence of the choke and check it would be found very difficult to design the ports 77, 95 and 96 with sufficient capacity to secure quick equalization between the auxiliary and supplemental reservoirs in normal release following restricted release, and at the same time avoid too rapid a feed-back from the supplemental reservoir to the auxiliary reservoir in normal release following service.

While I prefer to vent the supplemental reservoir directly to atmosphere during restricted release, other arrangements are known and are possible so far as the present invention is concerned. It may also be embodied in triple valves which include as a part of the triple valve structure an emergency vent valve or special mechanisms for controlling the rate of rise of brake cylinder pressure in emergency. Consequently, no limitation to the specific structure is implied, the invention being defined in the appended claims.

What is claimed is:—

1. The combination of an auxiliary reservoir; a supplemental reservoir; a triple valve of the type which moves from normal release position to restricted release position against yielding resistance, the triple valve including a port which connects said reservoirs in release position; and flow controlling means, including a valve which opens to permit free flow in said port toward said supplemental reservoir, and closes to restrict flow from said supplemental reservoir toward the auxiliary reservoir, the restriction being such that on forward cars in a train, back-flow from the supplemental to the auxiliary reservoir in release position will not materially resist motion to restricted release position.

2. The combination of an auxiliary reservoir; a supplemental reservoir; a triple valve, the triple valve including a port which serves to connect said reservoirs in release position; and differential flow means including a removable and interchangeable choke controlling the flow in said port and serving to restrict the flow from the supplemental reservoir toward the auxiliary reservoir relatively to flow in the reverse direction, the function of the choke being to restrict the rise of auxiliary reservoir pressure caused by back flow from the supplemental reservoir in release to a rate less than the rate of rise of brake pipe pressure in release on the last car of a train of maximum permissible length.

3. The combination of an auxiliary reservoir; a supplemental reservoir; a brake cylinder; a triple valve, said triple valve serving in service applications to feed air from the auxiliary reservoir to the brake cylinder and in release and recharge position to exhaust the brake cylinder and connect said reservoirs together; and means comprising a non-return valve and a removable and interchangeable choke which defines the capacity of a by-pass around said non-return valve, said valve serving to permit free flow to the supplemental reservoir and to limit reverse flow to the capacity of said choke, the function of the choke being to limit the rise of auxiliary reservoir pressure caused by back flow from the supplemental reservoir in release to a rate less than the rate of rise of brake pipe pressure in release on the last car of a train of maximum permissible length.

4. The combination of an auxiliary reservoir; a supplemental reservoir; a brake cylinder; a triple valve, said triple valve having an emergency application position in which it connects both reservoirs with the brake cylinder, a service application position in which it connects the auxiliary reservoir alone with the brake cylinder, a normal recharge position in which it connects the reservoirs together, and a restricted recharge position in which it isolates the reservoirs from each other; and means operative in normal recharge position for restricting flow from the supplemental reservoir to a rate at which the resulting rise of auxiliary reservoir pressure will not materially retard motion to restricted recharge position on the forward cars in a train, said means permitting free flow in the reverse direction.

5. The combination of an auxiliary reservoir; a supplemental reservoir; a brake cylinder; a triple valve, said triple valve having an emergency application position in which it connects both reservoirs with the brake cylinder, a service application position in which it connects the auxiliary reservoir alone with the brake cylinder, a normal recharge position in which it connects the reservoirs together, and a restricted recharge position in which it isolates the reservoirs from each other and vents the supplemental reservoir; and means operative in normal recharge position for restricting flow from the supplemental reservoir, said means permitting free flow in the reverse direction.

6. The combination of an auxiliary reservoir; a supplemental reservoir; a brake cylinder; a triple valve, said triple valve having an emergency application position in which it connects both reservoirs with the brake cylinder, a service application position in which it connects the auxiliary reservoir alone with the brake cylinder, a normal recharge position in which it connects the reservoirs together, and a restricted recharge position in which it isolates the reservoirs from each other and vents the supplemental reservoir slowly; and valve means controlling the supplemental reservoir connection in normal recharge position, said valve means serving to restrict flow from the supplemental reservoir to a rate at which the resulting rise of auxiliary reservoir pressure will not materially retard motion to restricted recharge position on the forward cars in a train, and permit free flow in the reverse direction.

7. The combination of an auxiliary reservoir; a supplemental reservoir; a brake cylinder; a triple valve, said triple valve having an emergency application position in which it connects both reservoirs with the brake cylinder, a service application position in which it connects the auxiliary reservoir alone with the brake cylinder, a normal recharge position in which it connects the reservoirs together, and a restricted recharge position in which it isolates the reservoirs from each other and vents the supplemental reservoir; and valve means controlling the supplemental reservoir connection in normal recharge position, said valve means serving to restrict flow from the supplemental reservoir, and permit free flow in the reverse direction.

8. The combination of an auxiliary reservoir; a supplemental reservoir; a brake cylinder; a triple valve, said triple valve having an emergency application position in which it connects both reservoirs with the brake cylinder, a service application position in which it connects the auxiliary reservoir alone with the brake cylinder, a normal release and recharge position in which it connects the reservoirs together and exhausts the brake cylinder, and a restricted release and recharge position in which it isolates the reservoirs from each other and exhausts the supplemental reservoir and brake cylinder slowly; and means operative in said normal release and recharge position and serving to throttle flow from the supplemental reservoir, and to permit free flow in the reverse direction.

9. The combination of an auxiliary reservoir; a supplemental reservoir; a brake cylinder; a triple valve, said triple valve having an emergency application position in which it connects both reservoirs with the brake cylinder, a service application position in which it connects the auxiliary reservoir alone with the brake cylinder, a normal release and recharge position in which it connects the reservoirs together and exhausts the brake cylinder, and a restricted release and recharge position in which it isolates the reservoirs from each other and exhausts the supplemental reservoir and brake cylinder slowly; and means including a one-way valve and a restricted by-pass therearound, operative in said normal release and recharge position and serving to throttle flow from the supplemental reservoir, and to permit free flow in the reverse direction.

10. The combination of an auxiliary reservoir; a supplemental reservoir; a brake cylinder; a triple valve, including a slide valve, said triple having a supplemental reservoir port through which supplemental reservoir air passes to the brake cylinder in emergency position, and a second and distinct port serving to connect the supplemental reservoir and auxiliary reservoir in normal release position both said ports being controlled by said slide valve; and means controlling said second port and serving to throttle flow from the supplemental to the auxiliary reservoir and permit free flow in the reverse direction.

11. The combination of an auxiliary reservoir; a supplemental reservoir; a brake cylinder; a triple valve, including a slide valve, said triple valve having a supplemental reservoir port through which supplemental reservoir air passes to the brake cylinder in emergency position and to exhaust in restricted release position, and a second and distinct port serving to connect the supplemental reservoir and auxiliary reservoir in normal release position both said ports being controlled by said slide valve; and means controlling said second port and serving to throttle flow from the supplemental to the auxiliary reservoir and permit free flow in the reverse direction.

12. The combination of an auxiliary reservoir; a supplemental reservoir; a brake cylinder; a triple valve, including a slide valve, said triple valve having a supplemental reservoir port through which supplemental reservoir air passes to the brake cylinder in emergency position, and a second and distinct port serving to connect the supplemental reservoir and auxiliary reservoir in normal release position both said ports being controlled by said slide valve; and means including a one-way valve and a restricted by-pass therearound, controlling said second port and serving to throttle flow from the supplemental to the auxiliary reservoir and permit free flow in the reverse direction.

13. The combination of an auxiliary reservoir; a supplemental reservoir, a brake cylinder; a triple valve, including a slide valve, said triple valve having a supplemental reservoir port through which supplemental reservoir air passes to the brake cylinder in emergency position and to exhaust in restricted release position, and a second and distinct port serving to connect the supplemental reservoir and auxiliary reservoir in normal release position both said ports being controlled by said slide valve; and means including a one-way valve and a restricted by-pass therearound, controlling said second port and serving to throttle flow from the supplemental to the auxiliary reservoir and permit free flow in the reverse direction.

CHARLES A. CAMPBELL.